Patented Nov. 22, 1927.

1,649,821

UNITED STATES PATENT OFFICE.

ADINO F. FILES, OF MAUMEE, OHIO.

POWDERED BUTTER COLORING FOR BUTTER AND OLEOMARGARINE.

No Drawing. Application filed May 21, 1923. Serial No. 640,549.

My invention has for its object to provide a dry butter coloring material for butter and oleomargarine that may be enclosed and distributed in paper packages to the public and consumers. The invention particularly has for its object to provide a butter coloring material that may be easily handled commercially and conveniently applied by the consumer.

Heretofore an oil coloring material has been used for coloring butter and oleomargarine. The oil is ordinarily contained in bottles or capsules. The bottles and capsules are liable to breakage, as well known, and loss of their contents and, frequently, the cause of discoloration or soiling or injury of other articles as well as the loss to merchants. Furthermore, the application of the oily liquid to the butter or oleomargarine to be colored is difficult and requires careful manipulation to prevent the escape of the colored oil from the surface of the butter or oleomargarine while the butter or oleomargarine is being colored. Also in order to color the butter or oleomargarine the oil must be carefully worked in. This is done by pouring a relatively small amount of the oil on the top of the butter or oleomargarine, preferably in a recess formed in the top, and then carefully working it from this recess into the butter or oleomargarine practically drop by drop until portions of the butter and oleomargarine have been colored. The result is that portions of the butter and oleomargarine are intensely colored by reason of a disproportionately large amount of the coloring material that is located in the said portions. These portions are then thoroughly mixed with the other portions of the butter or oleomargarine in order to more evenly distribute the coloring material, and unless the working is thoroughly done, which requires expenditure of considerable time and effort, the butter or oleomargarine still contains perceptible streaks of more intense coloring material. By my invention the coloring material may be readily distributed throughout small or minute portions of the butter or oleomargarine and then the butter or oleomargarine may be worked so as to uniformly color the butter in a very short time and with the expenditure of very little effort and care. My invention thus results in a great saving, both as to dispensing the coloring material and the application of the coloring material.

The dry coloring material containing my invention may be readily distributed over the butter or oleomargarine, as by sprinkling. Consequently the butter or oleomargarine may be spread out and the material may be readily distributed over the extended surface that is thus formed. The butter or oleomargarine may then be worked together without fear of loss or escape of the coloring material.

In forming the coloring material containing my invention I use coloring dyes in combination with a farinaceous material. The farinaceous material, however, must be of such a character that it is nonhygroscopic and nonaggregative, that is, it does not pack or form lumps by the aggregation of finely divided parts thereof. If the material is hygroscopic it is affected by the moisture of the air and the particles cement or attach to one another and prevent the distribution of the material within the butter or oleomargarine by reason of the fats that exist in large proportions in butter and oleomargarine. If the farinaceous material is cementitious in character, which causes its particles to adhere to one another, the distribution is rendered somewhat more difficult than if the material is neither hygroscopic nor aggregative. If the material is hygroscopic it is more difficult to distribute the material throughout the mass of butter or oleomargarine than if it is merely aggregative but nonhygroscopic. The farinaceous material, therefore, that I find preferable is rice flour since it remains in a finely divided state and readily distributes itself throughout the butter and the oleomargarine. Furthermore, the flour may be inserted in the cream before the butter is formed without causing the formation of any sediment in the buttermilk since the rice flour readily attaches itself to the butter or to the solid particles in the buttermilk.

The dyes used in forming the material embodying my invention may be varied, but I find it preferable to use benzeneazo-b-naphthylamine and orth-tolueneazo-b-naphthylamine, also known and indicated in the art as yellow A. B. and O. B. respectively. The dyes are mixed in the proportion of 1 of A. B. to 9 of O. B. to accomplish the best results. It is understood, however, that these proportions may be varied to vary the tint as may be desired. If desired, however, vegetable coloring materials may be used in place of yellow A. B. and O. B. To 10 grains of the dye mixture I add 240 grains of the flour, preferably rice flour. These ingredients are thoroughly mixed by trituration in order that the dyes may be thoroughly and intimately incorporated in the mixture, which causes the finely divided dye to adhere to the grains or particles of the flour. The flour thus forms an exceedingly valuable and efficient carrier of the dye so that when the mixture is distributed over the surface of the butter or oleomargarine the nonhygroscopic and nonaggregative carrier will readily subdivide and distribute and carry with it the dye into every minute portion of the butter or oleomargarine and thus readily disseminate the coloring material as the butter or oleomargarine is worked. The carrier, moreover, is of such a character that it readily releases the dye in the presence of a fat, the dye being absorbed by the fat, although cold. The dye enters into a solution with the fat and thus the fat is completely colored by the dye as distinct from being locally attached to particles of fat. This produces a uniformity of color throughout the butter or oleomargarine.

The quantity of the dye may be varied, as from 1 of the A. B. to 40 of the O. B., and from 1 of the A. B. to 3 of the O. B., according to the shade of the color desired. Also the quantity of the dye relative to the flour may be greatly varied, as from 1 to 50 parts of the flour or 1 to 10 parts of the flour, according to the intensity desired. Also the amount used per pound of butter or oleomargarine may be varied, both as to the intensity or shade of the color desired or as to the quantity of the dye in the coloring material. I have found that 1 of dye to 24 of flour where 5 grains of the mixture is used per pound of butter is best. This proportion produces an exceedingly efficient coloring material without the use of an excess of flour and it is a proportion that may be readily distributed and will coact with the fat in a pound of butter or oleomargarine to produce an attractive color tint to the butter or oleomargarine. Moreover, the 5 grain packages may be easily made up and may be readily dispensed to the consuming public and used by the consuming public in coloring butter and oleomargarine.

Furthermore, in making up the packages I find that the nonhygroscopic character of the rice flour is exceedingly important in that the trituration of the dye and the flour may be readily done by machinery and may be subdivided by machinery into desired quantities since the rice flour having the dye may be readily ejected in subdivided quantities into packages, such as envelopes, without dusting and in uniform quantities. Where the carrier is formed of materials that agglutinate or aggregate the particles adhere to parts of the machine or else they pack, with the result that varying quantities are ejected from a machine, and unless each quantity is carefully weighed and portions thereof carefully removed from the package varying amounts will be placed in the packages.

Rice flour thus provides in every way an ideal carrier for the dye, although wheat flour, corn flour and other flour may be used. Corn flour is more hygroscopic and agglutinative than rice flour, and wheat flour is more hygroscopic and agglutinative than corn flour, while potato flour is possibly the least efficient of any of the well known flours for forming the coloring material and coloring butter and oleomargarine.

I claim:

1. A dry coloring material for butter and the like, consisting of a dye and a flour derived from grain.

2. A dry coloring material for butter and the like comprising a dye and a flour derived from grain and substantially free of oil.

3. A dry coloring material for butter and the like comprising a dye and rice flour.

4. A dry coloring material for butter and the like comprising 1 part of aniline dye to 10 to 50 parts of flour derived from grain and substantially free from oil.

5. A dry coloring material for butter and the like comprising about 5 grains of the coloring material per pound of butter or the like and contained in packages and consisting of triturated dye and finely subdivided rice flour.

6. A dry coloring material for butter and the like comprising about 5 grains of the coloring material per pound of butter or the like and contained in packages and consisting of triturated dye and finely subdivided rice flour in the proportion of about 1 of the dye to 24 of the flour.

In testimony whereof I have hereunto signed my name to this specification.

ADINO F. FILES.